United States Patent [19]

Taguchi et al.

[11] Patent Number: 5,083,141
[45] Date of Patent: Jan. 21, 1992

[54] IMAGE FORMING APPARATUS

[75] Inventors: Kazushige Taguchi, Warabe; Hideya Furuta, Yokohama, both of Japan

[73] Assignee: Ricoh Company, Ltd., Tokyo, Japan

[21] Appl. No.: 574,449

[22] Filed: Aug. 29, 1990

[30] Foreign Application Priority Data

Aug. 30, 1989 [JP] Japan .................................. 1-221637
Nov. 21, 1989 [JP] Japan .................................. 2-300741
Mar. 5, 1990 [JP] Japan .................................. 1-51886

[51] Int. Cl.$^5$ ............................................. H04N 1/21
[52] U.S. Cl. ................................. 346/108; 358/296
[58] Field of Search .................... 346/108, 102 R, 160, 346/76 C; 355/327; 358/296, 300, 302, 75; 350/6.5, 6.7, 6.8

[56] References Cited

U.S. PATENT DOCUMENTS

| | | | |
|---|---|---|---|
| 1,947,204 | 8/1930 | Macno et al. | 355/244 |
| 1,947,660 | 7/1939 | Wheatley, Jr. et al. | 355/244 |
| 1,959,669 | 9/1940 | Hamada et al. | 355/326 X |
| 4,400,740 | 8/1983 | Traino et al. | 358/300 X |
| 4,408,826 | 10/1983 | Ike | 350/6.8 |
| 4,613,877 | 9/1986 | Spencer et al. | 346/108 X |
| 4,922,266 | 8/1990 | Bidner et al. | 346/108 X |
| 4,933,727 | 6/1990 | Mizuma et al. | 355/327 |
| 4,940,310 | 7/1990 | Hamada | 250/236 |

*Primary Examiner*—Mark J. Reinhart
*Attorney, Agent, or Firm*—Oblon, Spivak, McClelland, Maier & Neustadt

[57] ABSTRACT

An image forming apparatus has a device for performing a scanning operation using a laser beam by a polygon mirror at a predetermined timing; a writing device for sequentially forming a plurality of images by repeatedly performing an optical writing operation a plurality of times on a photosensitive body; a transfer device for sequentially overlapping and transferring the plurality of images onto a transferred member; and a device for starting the optical writing operation each time by the writing device from the same polygon mirror face. The photosensitive body is constructed by a photosensitive body belt and the optical writing operation is started from the same polygon mirror face approximately every integral multiple of one rotation of a driving roller for the photosensitive body.

6 Claims, 13 Drawing Sheets

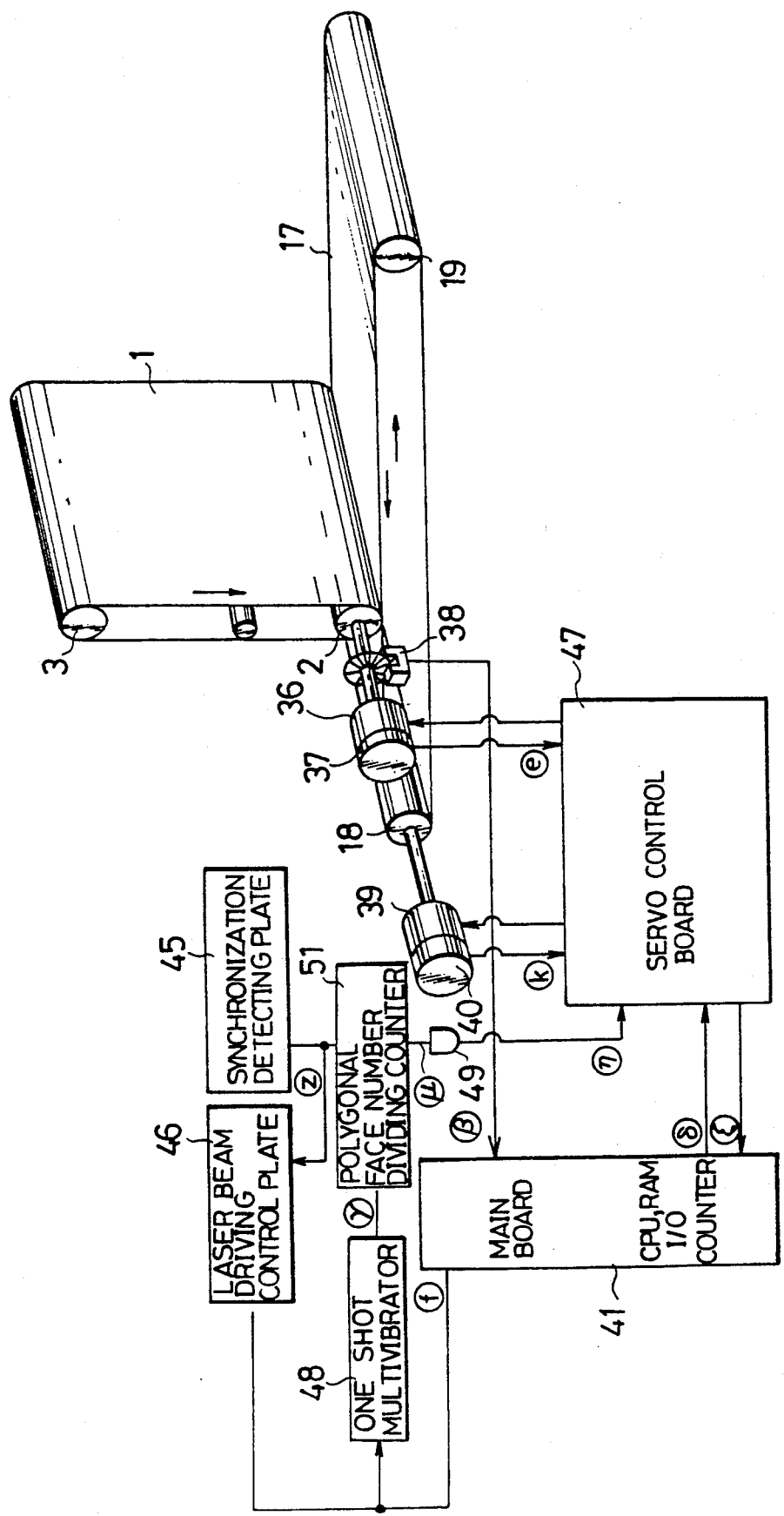

Fig. 3a

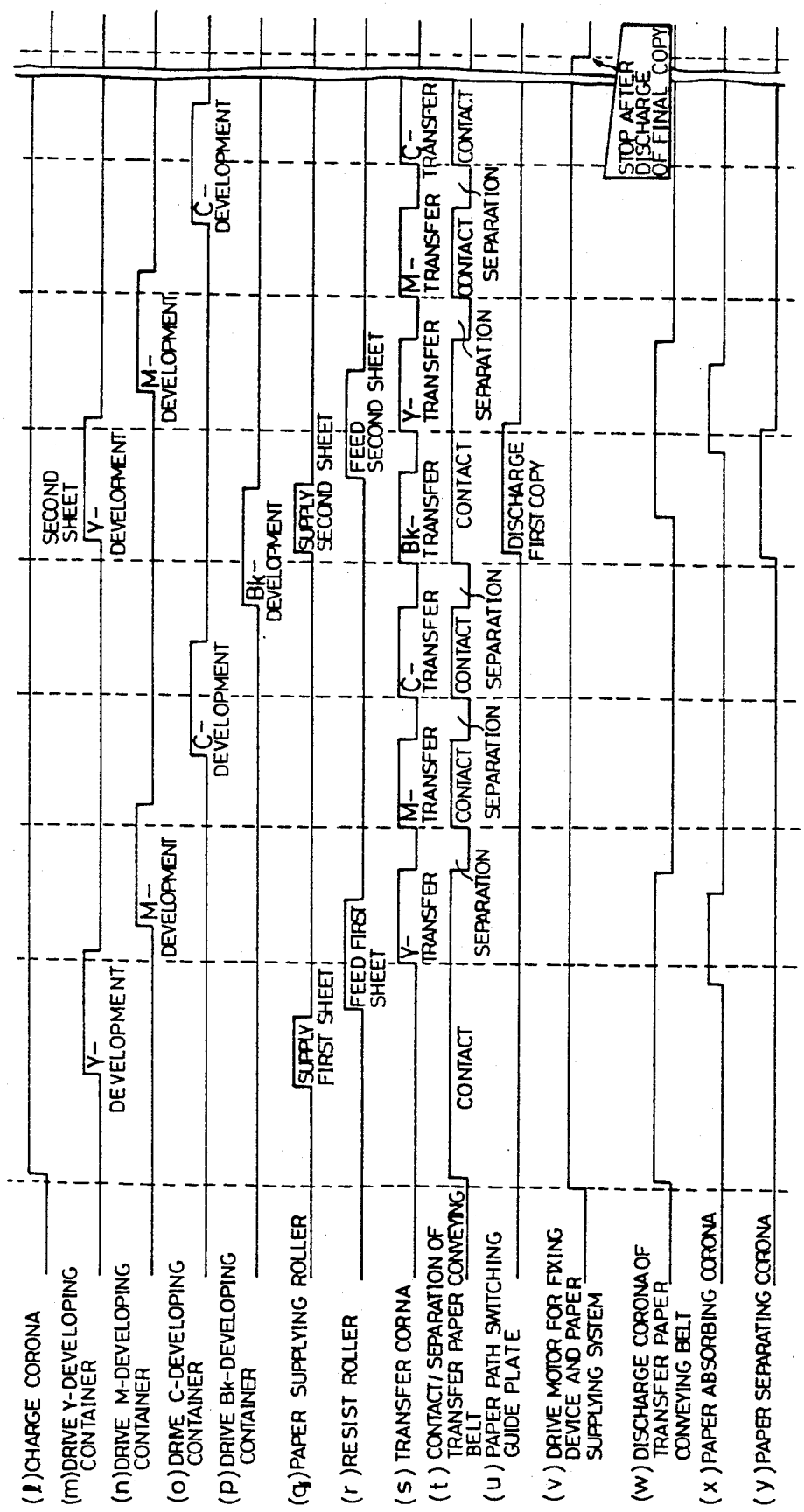

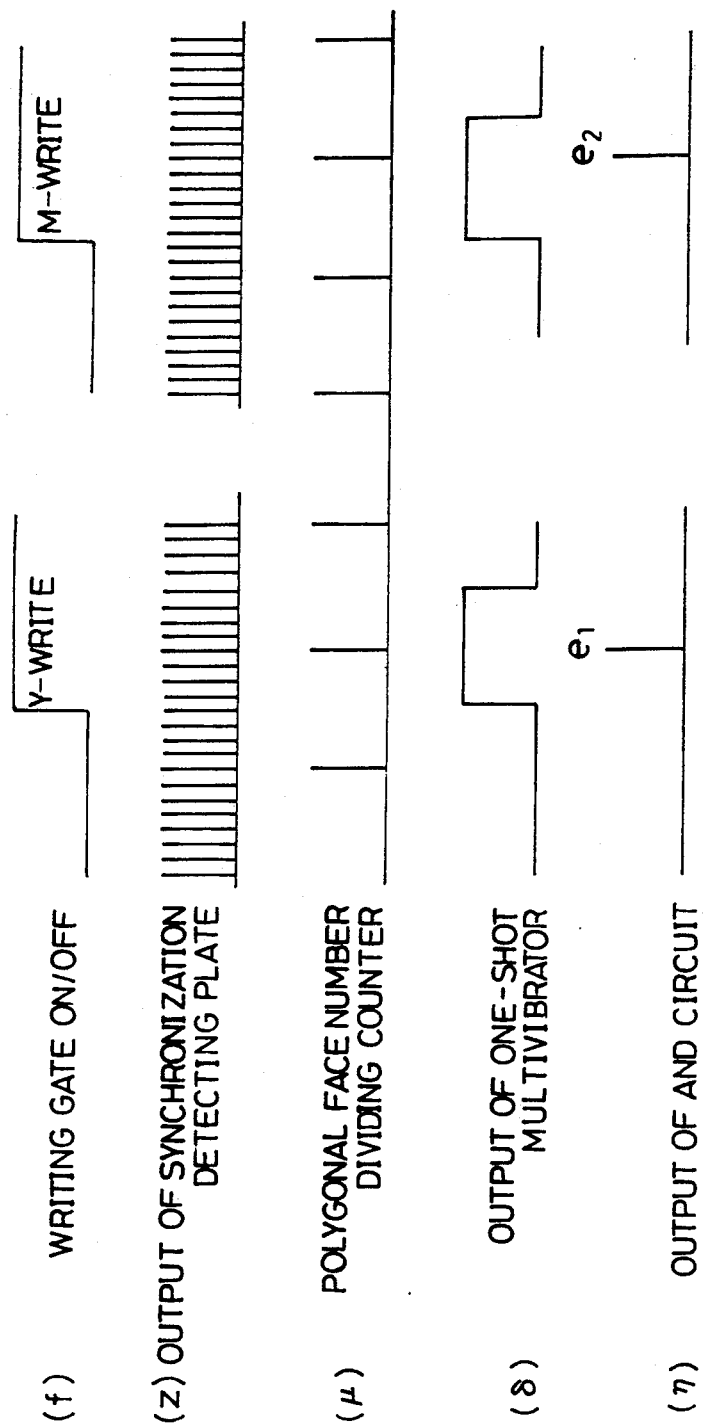

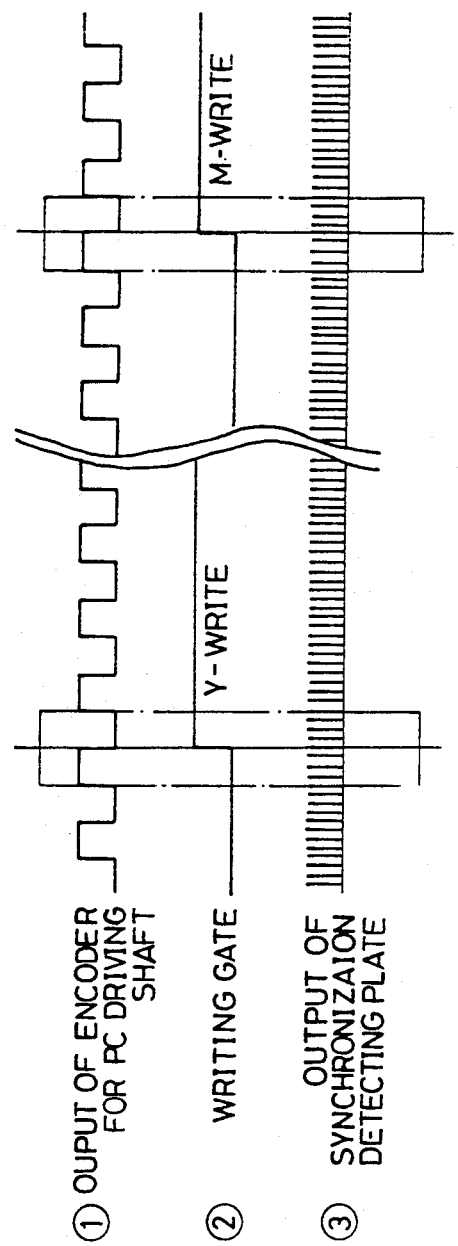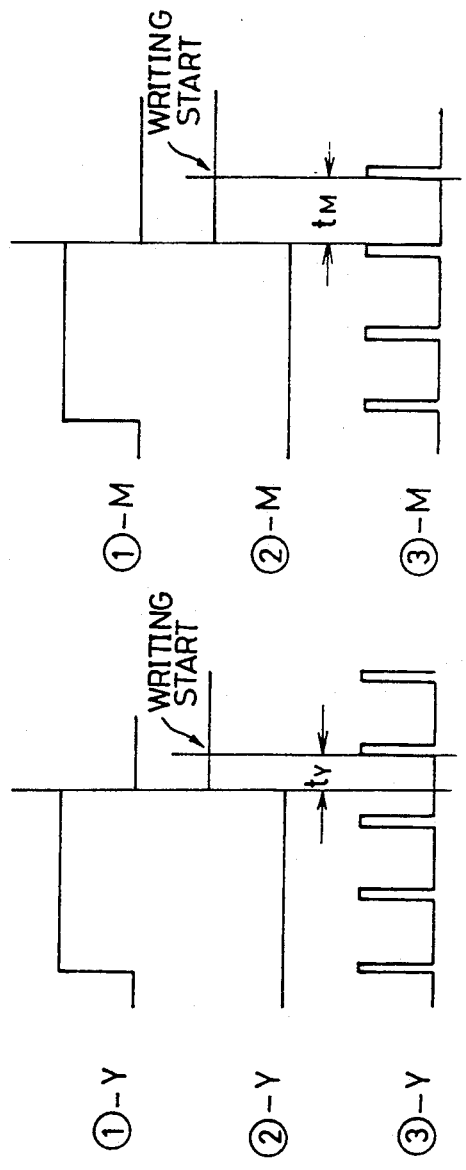

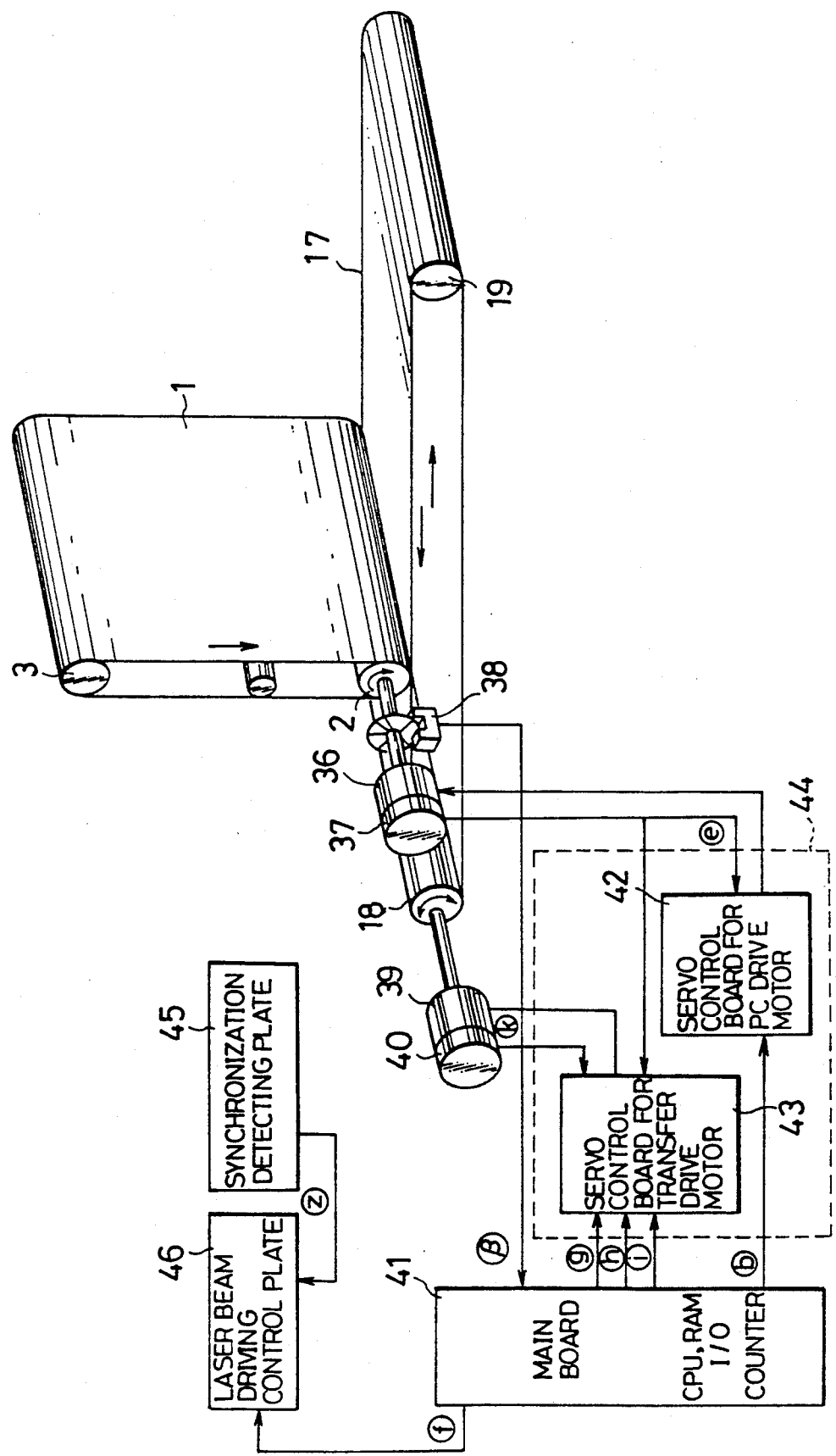

IMAGE FORMING APPARATUS

BACKGROUND OF THE INVENTION

1. Field of the Invention

The present invention relates to an apparatus for forming an image without causing any shift in position of the image due to inclination of a polygon mirror.

2. Description of the Related Art

In an image forming apparatus for performing a scanning operation using a laser beam by a polygon mirror, a writing position is changed by the inclination of a deflecting face of the polygon mirror.

Accordingly, a correction optical system composed of a cylindrical lens, a toroidal lens, etc. is disposed in the image forming apparatus of this kind to correct the writing position. In a black-and-white laser printer, a change in pitch of a scanning line is removed as much as possible by improving the accuracy in processing of the inclination of the polygon mirror. Thus, the accuracy in dot position in a cross scanning direction is set not to be practically influenced by the above change in pitch.

In a laser beam printer of a four drum system, writing positions are aligned with each other by conforming phases of a light beam with respect to individual rotary polyherons to each other. Such a laser printer is proposed in Japanese Patent Application Laying Open (KOKAI) No. 62-242471.

When the above correcting optical system is used in the image forming apparatus, it is possible to reduce image noises caused by an irregular pitch.

However, there is a case in which field curvature is caused in a certain place in which a lens for correction is arranged in the correction optical system. Accordingly, the arrangement position of the lens for correction is limited and it is impossible to make the correction optical system compact so that the entire apparatus is large-sized.

The change in pitch of a scanning line can be restricted by improving the accuracy in processing of the inclination of a polygon mirror face without using the correction optical system.

A black-and-white image is formed by improving the accuracy in processing of the inclination of the polygon mirror face. However, when images overlapped and transferred to each other to form a color image, a slight shift in color with respect to color images tends to be caused by the inclination of polygon mirror face.

The accuracy in processing of the inclination of the polygon mirror face must be greatly improved not to cause this shift in color in the case of the color image, thereby increasing manufacturing cost.

SUMMARY OF THE INVENTION

It is therefore an object of the present invention to provide an image forming apparatus in which a shift in color of images at their overlapping and transferring times is prevented and an image having a high quality is formed by starting a writing operation of the overlapped images from the same deflecting face of the polygon mirror.

The above object of the present invention can be achieved by an image forming apparatus comprising means for performing a scanning operation using a laser beam by a polygon mirror at a predetermined timing; writing means for sequentially forming a plurality of images by repeatedly performing an optical writing operation a plurality of times on a photosensitive body; transfer means for sequentially overlapping and transferring the plurality of images onto a transferred member; and means for starting the optical writing operation each time by the writing means from the same polygon mirror face.

Further, the photosensitive body comprises a photosensitive body belt and the optical writing operation is started from the same polygon mirror face approximately every integral multiple of one rotation of a driving roller for the photosensitive body.

In the above image forming apparatus, the scanning operation using a laser beam is performed by the polygon mirror at a predetermined timing. The writing means sequentially forms a plurality of images by repeatedly performing an optical writing operation a plurality of times on the photosensitive body. The optical writing operation each time is started by the writing means from the same polygon mirror face.

The plurality of images written by the writing means are sequentially overlapped and transferred by the transfer means to the transferred member, thereby forming an image having no shift in color and a high quality.

Further, in the present invention, the optical writing operation each time is started from the same polygon mirror face approximately every integral multiple of one rotation of the driving roller for the photosensitive body.

In accordance with such a structure, the plurality of images written by the writing means are also sequentially overlapped and transferred by the transfer means to the transferred member, thereby forming an image having no shift in color and a high quality.

Further objects and advantages of the present invention will be apparent from the following description of the preferred embodiments of the present invention as illustrated in the accompanying drawings.

BRIEF DESCRIPTION OF THE DRAWINGS

FIGS. 1 to 4 and 5a to 5e are views for explaining an image forming apparatus in an embodiment of the present invention in which:

FIG. 1 is an explanatory view of an entire construction of the image forming apparatus;

FIG. 2 is an explanatory view of a driving control section in the image forming apparatus;

FIG. 3 is a view of signal waveforms showing an entire operation of the image forming apparatus;

FIG. 4 is a view of signal waveforms showing a main operation of the image forming apparatus;

FIG. 5a is a flow chart showing the operation of a main board;

FIG. 5b is a flow chart showing a pulse interruption operation of an encoder for a driving shaft;

FIG. 5c is a flow chart of the operation of a servo control board;

FIG. 5d is a flow chart showing an interruption operation of an encoder for a PC drive motor; and FIG. 5e is a flow chart showing an interruption operation of an encoder for a transfer drive motor;

FIG. 6 is an enlarged view of signal waveforms within broken lines in FIG. 4; and FIGS. 7a, 7b and 8 are views for definitely explaining the image forming apparatus in the embodiment of the present invention in which:

FIGS. 7a and 7b are views of signal waveforms showing a writing operation in a general image forming apparatus; and FIG. 8 is a view for explaining a driving control section in the general image forming apparatus.

DESCRIPTION OF THE PREFERRED EMBODIMENTS

The preferred embodiments of an image forming apparatus in the present invention will next be described in detail with reference to the accompanying drawings.

Figure 1:
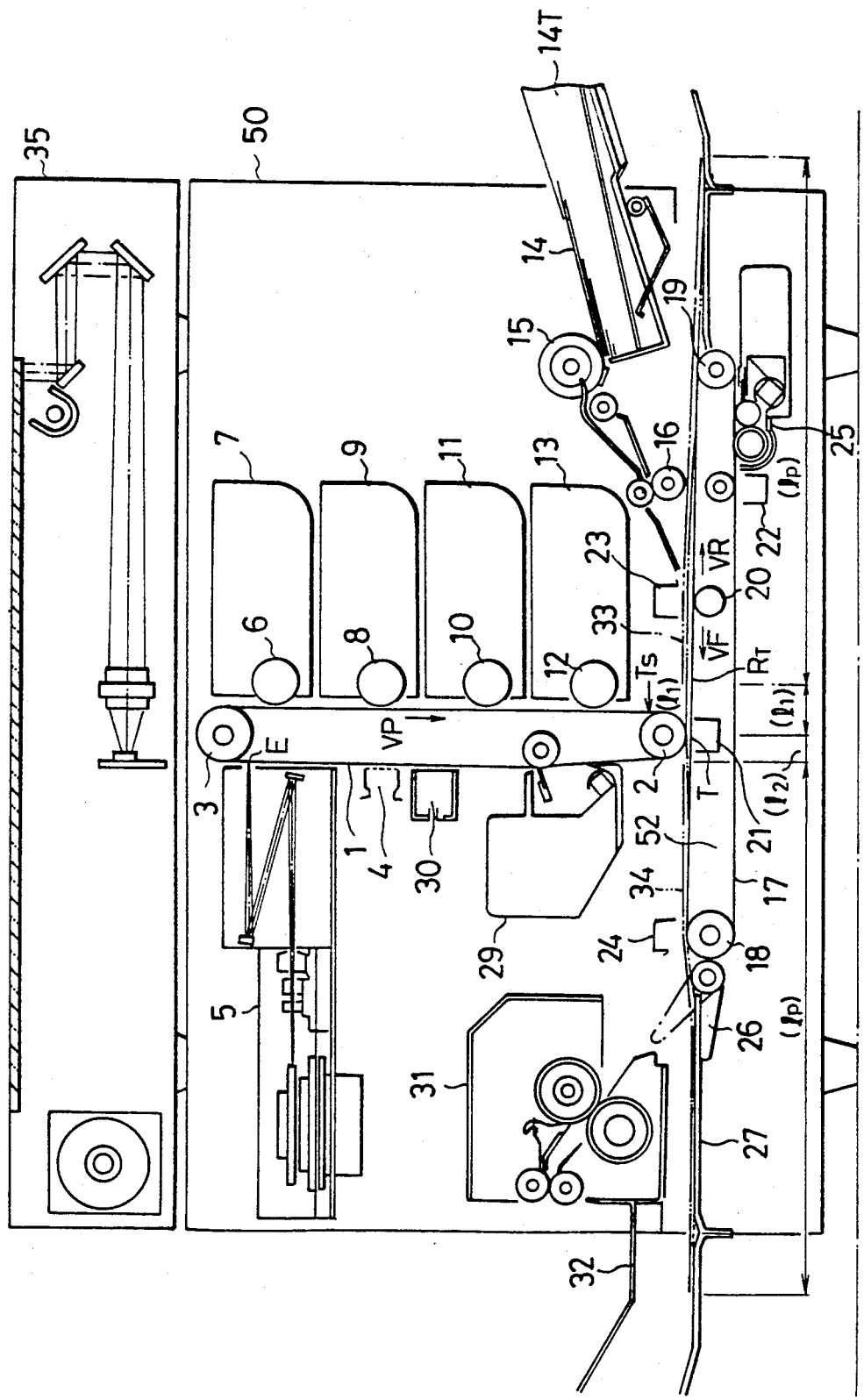

FIG. 1 is an explanatory view showing the entire construction of an image forming apparatus in an embodiment of the present invention. In this figure, the image forming apparatus has a reader 35 for reading a color image, a body 50 of a copying machine, a photosensitive body belt 1, a transfer belt 17 for supporting a sheet of transfer paper, and a optical writing unit 5 as a writing means.

As shown in FIG. 1, the color image reader 35 is disposed in an upper portion of the body 50 of the copying machine. A transfer paper tray 14T and a paper discharging tray 32 are attached to the body 50 at opposite lower ends thereof.

A transfer paper conveying path 52 is formed within the body 50 in a horizontal direction between the paper discharging tray 32 and the transfer paper tray 14T. The transfer belt 17 is wound around a driving roller 18 and a driven roller 19 and constitutes a main section of the transfer paper conveying path 52.

A paper supplying roller 15 is disposed in the vicinity of an outlet of the transfer paper tray 14T. A sheet of transfer paper 14 supplied from the paper supplying roller 15 is fed to the transfer paper conveying path 52 through a resist roller 16.

A transfer belt cleaner 25 is disposed in the vicinity of the driven roller 19 and is proximately opposed to the transfer belt 17. A corona discharging portion 22 is disposed in the vicinity of the transfer belt cleaner 25. A paper separating charger 24 is disposed in the vicinity of the driving roller 18 and is proximately opposed to the transfer belt 17. A path switching member 26 is disposed in the transfer paper conveying path 52 in the vicinity of the driving roller 18.

The photosensitive body belt 1 is wound around a driving roller 2 and a driven roller 3 in a central portion of the transfer paper conveying path 52 and is movably disposed in a direction perpendicular to this transfer paper conveying path 52. Yellow, magenta, cyan and black developing containers 7, 9, 11 and 13 are disposed on the side of the transfer paper tray 14T within the body 50 and are proximately opposed to the photosensitive body belt 1. These developing containers 7, 9, 11 and 13 respectively have yellow, magenta, cyan and black developing rollers 6, 8, 10 and 12.

The optical writing unit 5 is disposed on the side of the paper discharging tray 32 within the body 50 and is proximately opposed to the photosensitive body belt 1. The optical writing unit 5 is also disposed in the vicinity of the driven roller 3. A fixing device 31 is connected to the paper discharging tray 32. A photosensitive body belt cleaner 29 is disposed between the fixing device 31 and the photosensitive body belt 1 and is proximately opposed to the photosensitive body belt 1. A discharging device 30 and a charge corona portion 4 are disposed between the photosensitive body belt cleaner 29 and the optical writing unit 5 and are proximately opposed to the photosensitive body belt 1.

A transfer corona portion 21 is proximately opposed to the driving roller 2 through the transfer belt 17. A paper adsorbing charger 23 is disposed between the driving roller 2 and the resist roller 16 and is proximately opposed to the transfer belt 17.

In this embodiment, a scanning operation using a laser beam is performed by the optical writing unit 5 and a polygon mirror at a predetermined timing. Thus, an optical writing operation with respect to the photosensitive body belt 1 is repeatedly performed a plurality of times. Each optical writing operation is started from the same reflecting face of the polygon mirror.

FIG. 2 is an explanatory view of a driving control section in the image forming apparatus in this embodiment. In this figure, reference numerals 1, 17, 41 and 47 respectively designate the photosensitive body belt, the transfer belt, a main board and a servo control board.

As shown in FIG. 2, the photosensitive body belt 1 is movably wound around the driving roller 2 and the driven roller 3. The transfer belt 17 is movably wound around the driving roller 18 and the driven roller 19 in a direction perpendicular to the longitudinal direction of the photosensitive body belt 1.

A PC drive motor 36 is connected to a shaft of the driving roller 2 and drives the driving roller 2. An encoder 37 is attached to the PC drive motor 36. An encoder 38 for a PC driving shaft is attached to the shaft of the driving roller 2. A detecting signal of the encoder 38 for the PC driving shaft is inputted to the main board 41. A detecting signal of the encoder 37 is inputted to the servo control board 47. A control signal from the servo control board 47 is inputted to the PC drive motor 36.

A transfer drive motor 39 is connected to a shaft of the driving roller 18. An encoder 40 is attached to the transfer drive motor 39. A detecting signal of the encoder 40 is inputted to the servo control board 47. A control signal from the servo control board 47 is inputted to the transfer drive motor 39.

The main board 41 and the servo control board 47 are connected to each other. The main board 41 is connected to a one-shot multivibrator 48 and a laser beam driving control plate 46. A synchronization detecting plate 45 is connected to the laser beam driving control plate 46 and is also connected to one input terminal of an AND circuit 49 through a polygonal face number dividing counter 51. An output terminal of the one-shot multivibrator 48 is connected to the other input terminal of the AND circuit 49. An output terminal of the AND circuit 49 is connected to the servo control board 47.

The operation of the image forming apparatus constructed as above will next be described.

Figure 4:
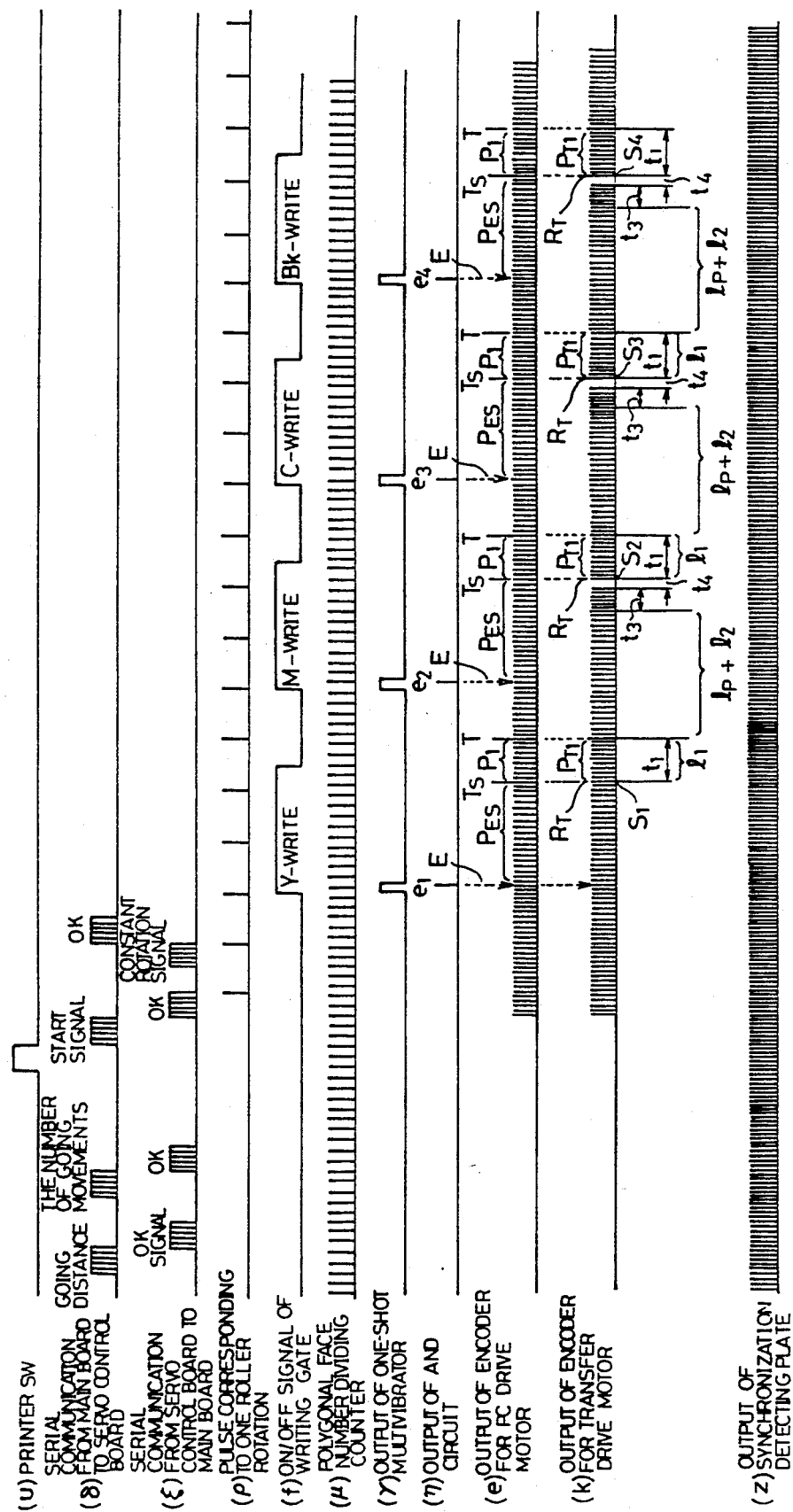

FIG. 3 is a view of signal waveforms showing an entire operation of the image forming apparatus in this embodiment. FIG. 4 is a view of signal waveforms showing the operation of a main section in the image forming apparatus in this embodiment. FIG. 6 is an enlarged view of signal waveforms within broken lines in FIG. 4.

As shown in FIG. 2, bi-directional serial communication can be performed between the main board 41 and the servo control board 47. Accordingly, the main board 41 transmits a going distance signal capable of being judged from the size of a sheet of transfer paper to the servo control board 47. When the servo control board 47 receives this going distance signal, the servo control board 47 transmits an OK signal indicative of the reception of this going distance signal to the main board 41 as shown by items (δ) and (ε) in FIG. 4. Next, a signal indicative of the number of going movements estimated from the number of copies and a color mode is transmitted from the main board 41 to the servo control board 47. When the servo control board 47 receives this signal indicative of the number of going movements, the servo control board 47 transmits an OK signal to the main board 41.

Figure 3A:
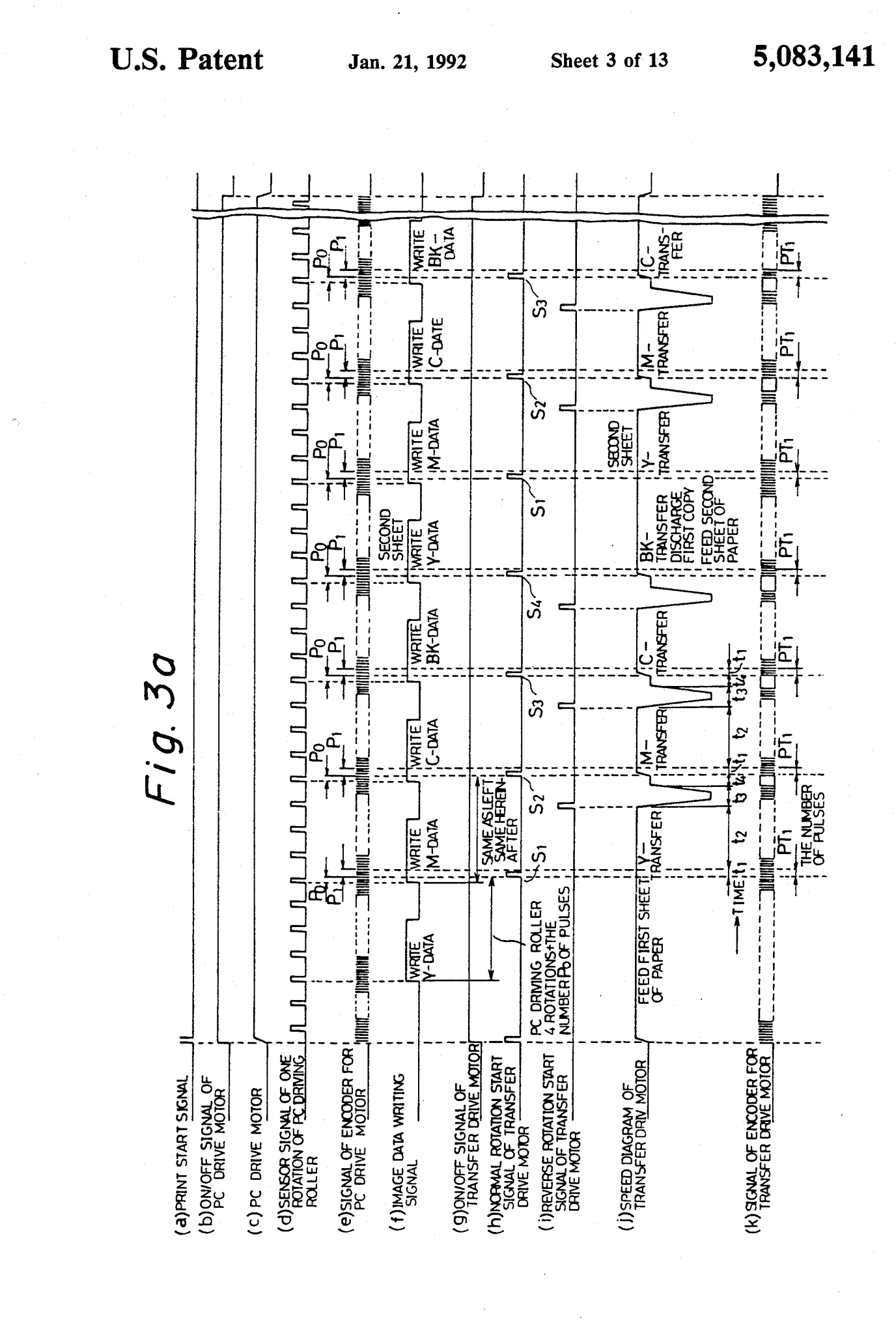

When a printer switch is turned on as shown by item (a) in FIG. 3a and item (u) in FIG. 4, a start signal is transmitted from the main board 41 to the servo control board 47. The OK signal is transmitted to the main board 41 from the servo control board 47 receiving this start signal. Further, a control signal for rotating the PC drive motor 36 and the transfer drive motor 39 in a normal direction is outputted as shown by items (b) and (h) in FIG. 3a.

When line speeds of the PC drive motor 36 and the transfer drive motor 39 have respectively reached $V_P$ and $V_F$, a signal indicative of a constant rotation is transmitted from the servo control board 47 to the main board 41. The main board 41 receiving this signal indicative of a constant rotation transmits the OK signal to the servo control board 47 as shown by items (δ) and (ε) in FIG. 4.

After the main board 41 has received the signal indicative of a constant rotation, the main board 41 turns on a yellow writing gate in synchronization with a pulse corresponding to one roller rotation as shown by items (f) and (ρ) in FIG. 4.

As shown by item (z) in FIG. 4, the laser beam driving control plate 46 is operated in synchronization with a detecting signal of the synchronization detecting plate 45, thereby performing the optical writing operation with respect to the photosensitive body belt 1. In this case, each optical writing operation is started by a laser beam reflected from the same reflecting face of the polygon mirror.

As shown by items (f) and (γ) in FIG. 4, the one-shot multivibrator 48 generates pulses for a time of a synchronization detecting output corresponding to the number of polygon mirror faces, i.e., pulses corresponding to eight synchronization detection periods in synchronization with a rise of a signal of the above writing gate. As shown by item (z) in FIG. 4, an output signal of the synchronization detecting plate 45 is inputted to the polygonal face number dividing counter 51 and is divided into eight sections to obtain a μ signal. As shown by items (μ) and (γ) in FIG. 4, this output signal of the polygonal face number dividing counter 51 and the above output signal of the one-shot multivibrator are inputted to the AND circuit 49. As shown by item (η) in FIG. 4, a timing pulse $e_1$ in the actual yellow writing operation is outputted from the AND circuit 49.

The servo control board 47 counts the number of output signals from the encoder 37 from a time point at which the timing pulse $e_1$ is outputted. A counting value indicative of the number of pulse signals from the encoder 40 for the transfer drive motor 39 is set to zero and is stored to a memory at a time point of a signal $S_1$ at which the counted value of output signals of the encoder 37 has reached a value $P_{ES}$ as shown by item (e) in FIG. 4 and the photosensitive body belt has reached a point Ts in FIG. 1. This point Ts is set to a point $R_T$ as a returning position.

Thereafter, the speeds and positions of the photosensitive body belt and the transfer belt are controlled such that a condition $P_1 = PT_1$ is formed until a point T after a time $t_1$, thereby transferring and conveying the sheet of transfer paper.

The photosensitive body belt (which is called a PC belt in the following description) 1 moved by the PC drive motor 36 is discharged by the discharging device 30 and an entire face of this belt is uniformly charged by the charger 4 so as to satisfy the following processing conditions.

1. Light is irradiated onto the PC belt surface from which toner is removed by a PC cleaner in advance. Otherwise, a corona discharging operation is performed on this PC belt surface. Thus, the discharging device sets a surface potential of the PC belt to approximately zero bolt.

2. In the case of a negative-positive process, the toner is attached onto an uncharged surface portion of the photosensitive body. Accordingly, the entire surface of the PC belt must be uniformly charged by the charger.

3. The charger performs a uniform charging operation by corona discharge. In this case, ozone is slightly generated by this corona discharge. This ozone is decomposed for a short time when the discharging operation is stopped. However, there is a case in which the PC belt surface is adversely affected by this ozone so that an image becomes unclear. Therefore, air is supplied or sucked by a fan, etc. backward from an unillustrated charger to remove an influence of the ozone.

As mentioned above, the encoder 38 for the PC driving shaft is arranged on the shaft of the PC driving roller 2 and outputs a corresponding pulse every one rotation of this roller by dividing signals from this encoder as shown by item (d) of FIG. 3a. In the example shown in FIG. 3a, the operation of a semiconductor laser (which is called an LD in the following description) in the optical writing unit begins to be controlled at a timing of a third pulse from this one rotation detecting sensor. Another optical writing unit composed of another type laser, an LED array, an LCD array, etc. may be used instead of the semiconductor laser. First, the optical writing operation based on yellow image data is started at the above-mentioned timing to form an electrostatic latent image.

In this case, as mentioned above, each optical writing operation is started by the laser beam reflected from the same reflecting face of the polygon mirror. Accordingly, when images are overlapped and transferred to each other, no shift in color is caused by the inclination of the polygon mirror face.

With respect to the optically written image data, decomposed lights such as blue, green and red color lights are respectively read by the reader 35 for reading a color image and arranged in an upper portion of the image forming apparatus in FIG. 1. The above image data are provided as writing image data with respect to each color of yellow, magenta, cyan and black by performing an image processing based on an intensity level of each color light.

The above image data may be constructed by image data outputted from another color image processing system such as a color facsimile, a word processor, a personal computer, etc. A connection interface for this color image processing system may be individually disposed.

The developing containers 7, 9, 11 and 13 for developing an electrostatic latent image are normally disposed in positions in which the developing rollers 6, 8, 10 and 12 do not come in contact with the PC belt surface.

One of the developing containers corresponding to a certain color is pressed in the left-hand direction in FIG. 1 for only a time between just before and after a latent image face having the corresponding color reaches the developing roller with respect to this color. Thus, the position of the developing roller is set to a position in which the developing roller comes in contact with the photosensitive body face by a predetermined amount.

Simultaneously, the developing roller and a portion for performing a developing operation begin to be operated so as to provide a developing performance with respect to only this developing container (see items (m) to (p) of FIG. 3b).

Since the latent image with respect to the yellow image is first formed, the yellow developing container 7 comes in contact with the photosensitive body face and is operated at a predetermined timing as shown by item (m) of FIG. 3b, thereby developing the yellow image.

A transfer processing will next be performed. Upper and lower positions of the roller 20 are switched such that the transfer belt 17 comes in contact with the PC belt face in a transfer section (a PC driving roller section).

When a printing operation is started, the transfer belt 17 is moved in the left-hand arrow direction as mentioned above. Thereafter, the switching roller 20 for the contact and separation of the transfer belt is pressed toward the upper position thereof such that the transfer belt 17 comes in contact with the PC belt 1 as shown by item (t) of FIG. 3b.

Then, a sheet of transfer paper 14 is supplied by the paper supplying roller 15 at a predetermined timing. The sheet of transfer paper is then conveyed onto the transfer belt 17 by the resist roller 16 at a predetermined timing at which the position of the sheet of transfer paper is in conformity with the position of an image formed on the PC belt face.

As shown by item (x) of FIG. 3b, the corona discharging operation of a predetermined polarity is performed by the paper adsorbing charger 23 with respect to the conveyed sheet of transfer paper 14. Thus, the sheet of transfer paper 14 comes in close contact with the transfer belt such that no position of the sheet of transfer paper is shifted during the transfer operation. The above switching roller 20 for the contact and separation of the transfer belt is also used as an electrode opposite to the paper adsorbing charger 23 so as to simplify the construction of the image forming apparatus.

The entire face of the transfer belt is uniformly discharged by the corona discharging portion 22 before the transfer process with respect to the first color as shown by item (w) of FIG. 3b. At this time, the transfer belt is cleaned by the transfer belt cleaner 25.

When a front end of the developed yellow image has reached the point Ts separated from a transfer point T by a predetermined distance, a signal $S_1$ for starting a normal rotation of the transfer drive motor 39 is inputted to the servo control board 47 for the transfer drive motor 39 as shown by item (h) of FIG. 3a.

In this case, the transfer drive motor 39 is already rotated in the normal direction at the time point of the signal $S_1$ so that the normal rotation of this transfer drive motor is continued as shown by item (j) of FIG. 3a.

At the time point of the signal $S_1$, the front end of the sheet of transfer paper has substantially reached a point RT located before the transfer point T by a distance $l_1$. Further, at the time point of the signal $S_1$, the front end of the yellow image on the PC belt has reached the point Ts located before the point T by the distance $l_1$.

In the example shown in FIG. 3a, at the time point of the signal $S_1$, the PC driving roller is rotated four times and is further rotated by the number $P_0$ of pulses of the encoder 37 for the PC drive motor from the writing start timing of the yellow image data as shown by items (d), (e), (f) and (h) of FIG. 3a. In the meantime, the PC belt is moved by a distance from a point E indicative of an image writing position to the point Ts.

After a time $t_1$ has passed from the time point of the signal $S_1$, the front end of the yellow image and the front end of the sheet of transfer paper are moved by the distance $l_1$ and have reached the transfer point T. Thereafter, the transfer processing with respect to the yellow image is performed by the transfer corona charger 21.

The number of pulses of the encoder 37 for the PC drive motor is $P_1$ and the number of pulses of the encoder 40 for the transfer drive motor is $PT_1$ at this time $t_1$ as shown by items (e) and (k) of FIG. 3a. $P_1 = PT_1$ is formed when both the belts are moved by the same distance per one pulse with respect to resolution of both the encoders. When a ratio of moving distances of both the belts per one pulse is $\alpha$, the numbers $P_1$ and $PT_1$ of pulses are values corresponding to this ratio $\alpha$.

In this embodiment, the condition $P_1 = PT_1$ is set in the following description.

When the transfer processing with respect to the yellow image proceeds, the front end of the sheet of transfer paper is separated from the transfer belt. The front end of the sheet of transfer paper is further moved toward a paper end guide plate 27 through the transfer paper path switching member 26 shown by a solid line.

When the transfer processing with respect to the yellow image further proceeds, the sheet of transfer paper is moved by a distance $l_1 + l_P$ (the size of the sheet of transfer paper) $+ l_2$ from the time point of the signal $S_1$ when a rear end of the sheet of transfer paper is moved from the point T by the distance $l_2$. At this time $(t_1 + t_2)$, the transfer drive motor is rotated by a reverse signal in a reverse direction as shown by items (i) and (j) of FIG. 3a and the sheet of transfer paper 14 is located in a position 34 shown by a two-dotted chain line.

The switching roller 20 for the contact and separation of the transfer belt is moved to the lower position thereof before the reverse rotation of the transfer drive motor. Thus, the transfer belt is separated from the PC belt face.

The transfer belt and the sheet of transfer paper are quickly returned by the reverse rotation of the transfer drive motor at a speed VR ($>$VF) in the direction of a right-hand arrow. At this time, the positions of the transfer belt and the sheet of transfer paper are controlled and returned in the right-hand direction for a short returning time $t_2$ by a distance equal to the distance moved in the left-hand direction for time $t_1 + t_2$. The encoder 40 for the transfer drive motor 39 then counts the number of pulses corresponding to the distance $l_1 + l_P$ (the size of the sheet of transfer paper) $+ l_2$. Thereafter, the transfer belt is quickly returned at the speed VR and the movement of the transfer belt is stopped when the counting value indicative of the number of pulses from the encoder 40 becomes value zero stored to the memory as mentioned above.

At this returning time, a rear end of the sheet of transfer paper is separated from the transfer belt and is moved toward the paper rear end guide plate 28. Thus, the sheet of transfer paper is accurately returned by a predetermined distance and the sheet of transfer paper 14 is stopped in a position 33 shown by a two-dotted chain line in which the position of the front end of the sheet of transfer paper is located at the point RT. Thus, at a time $t_4$, the image forming apparatus attains a standby state for the transfer processing with respect to a magenta image as a second color image.

The magenta image as a second color image is already formed on the PC belt 1 while the yellow image as a first color image is transferred onto the sheet of transfer paper. Namely, an electrostatic latent image based on magenta image data begins to be optically written and formed by the control and operation of the semiconductor laser when the PC driving roller is rotated integral times such as four times in the case of FIGS. 3a and 3b from the beginning of the writing operation of the yellow image.

The yellow developing container 7 comes in contact with the PC belt face and is operated only in a yellow image region. The yellow developing container 7 is separated from the PC belt face and the operation of this container is stopped before a magenta image region with respect to the second color reaches the yellow developing container.

As shown by item (n) of FIG. 3b, the magenta developing container 8 comes in contact with the PC belt face and is operated before a front end of the magenta image region reaches the magenta developing container after the yellow image region has passed through the magenta developing container. Thus, only a latent image region for the magenta image is developed as the magenta image.

Similar to the case of the yellow image with respect to the first color, when a front end of the magenta image has reached the point Ts, the PC driving roller is rotated four times and is further rotated by the number $P_0$ of pulses of the encoder 37 for the PC drive motor from the writing start timing of magenta image data. At this time point, a signal $S_2$ for starting the normal rotation of the transfer drive motor is inputted to a control driving circuit (servo control board) 47.

Simultaneously or slightly after the input of the signal $S_2$, the switching roller 20 for the contact and separation of the transfer belt begins to be pressed toward the upper position thereof. Thus, this roller 20 comes in contact with the transfer belt until at least the front end of the sheet of transfer paper has reached the point T.

Similar to the case of the yellow image, with respect to the PC belt 1, the number of pulses of the encoder for the PC drive motor is $P_1$ and the PC belt face is moved by the moving distance $l_1$ for the time $t_1$ from the timing of the signal $S_2$.

The speed of the sheet of transfer paper is increased from zero to speed VF(=VP) for this time $t_1$. In the meantime, the position of the sheet of transfer paper is controlled to provide the number of pulses equal to the number $PT_1$ of pulses for the time $t_1$ from the time point of the signal $S_1$ with respect to the first color, thereby forming $P_1 = PT_1$.

Thus, the front end of the sheet of transfer paper is moved by the distance $l_1$ for the time $t_1$ and the yellow and magenta images with respect to the first and second colors are aligned with each other on the sheet of transfer paper.

Thereafter, the above-mentioned processings are repeatedly performed. Namely, the magenta image is transferred onto the sheet of transfer paper and the sheet of transfer paper is quickly returned. Further, the writing operation of cyan image data, cyan development and the transfer operation of a cyan image are performed. Then, the sheet of transfer paper is quickly returned and the writing operation of black image data, black development and the transfer operation of a black image are performed.

The operation of the image forming apparatus after the transfer operation of the black image will next be described.

In the transfer process of the black image, the paper path switching member 26 is switched to a position shown by a one-dotted chain line. In the transfer process, the sheet of transfer paper is moved toward the fixing device 31 while the sheet of transfer paper is discharged by a paper separating charger from a front end thereof. The transfer drive motor is continuously rotated in the normal direction even when the transfer operation with respect to a rear end of the sheet of transfer paper is completely performed. Thus, the sheet of transfer paper is conveyed in the left-hand direction and a fixed color print is discharged onto the tray 32 as shown by items (j), (u), (v) and (y) of FIG. 3b.

At this time, as shown by item (w) of FIG. 3b, the transfer belt 17 is uniformly discharged by performing the corona discharging operation from a timing at which a rear end portion of the first sheet of transfer paper in an image region thereof has passed through the discharging device 22.

When the processings shown in FIGS. 3a and 3b are repeatedly performed, the black image data are written onto the first sheet of transfer paper. Thereafter, as shown in FIGS. 3a and 3b, yellow image data are written to a second sheet of transfer paper. The operations and controls of the second sheet of transfer paper and the transfer belt are similar to those in the case of the first sheet of transfer paper.

The remaining toner is removed from the PC belt 1 by the cleaner 29 after the transfer processing. Further, the remaining charge is removed from the PC belt by the discharging device 30 and the PC belt is then moved toward the charger 4.

A final color print is thus discharged onto the tray 32 and the PC belt 1 and the transfer belt 17 are cleaned and discharged. Thereafter, the operations of the PC belt 1 and the transfer belt 17 are stopped and the operating state of the image forming apparatus is returned to its initial state.

In this embodiment, the encoders 37 and 40 have high resolution 20,000 pulses per one rotation to control the speeds and positions of the photosensitive body belt and the transfer belt with high accuracy.

In the above description, the image is formed in an order of yellow, magenta, cyan and black and the yellow, magenta, cyan and black developing containers are sequentially arranged from above. However, the present invention is not limited to such an arrangement.

Further, in the above description, the electrostatic latent image of each color is optically written and formed by a semiconductor laser, etc. using digitally processed image data of each color. However, a color image is similarly recorded by forming an analog optical image provided by a normal electrophotographic copying machine at the point E by controlling the position of this optical image at a predetermined timing.

In the above description, the yellow, magenta, cyan and black color images are overlapped. When two or three colors of such four colors are overlapped, the operations of the respective constructional portions of the image forming apparatus are controlled such that the formation and transfer of an image having a required color are sequentially performed two or three times, thereby completing the formation and transfer thereof.

In the case of a single color, the developing container of this color comes in contact with the PC belt and is operated until the image is completely formed on a predetermined number of sheets of transfer paper. The transfer belt continuously comes in contact with the PC belt. The paper path switching member 26 is held in a position for guiding the sheet of transfer paper toward the fixing device 31 to perform a fixing operation.

Accordingly, when the images are repeatedly formed, a print making speed in the case of three colors is 4/3 times that in the case of four colors. Further, the print making speed in the case of two colors or a single color is respectively two or four times that in the case of four colors, thereby performing the image forming operation at a high speed.

The developing colors are not limited to the four colors mentioned above, but it is possible to combine and use blue, green, red and other desirable colors in accordance with necessity.

FIGS. 7a and 7b show signal waveforms for performing the writing operation in a general image forming apparatus to clearly explain the effects of the present invention. As can be seen from FIGS. 7a and 7b, a gate for starting the writing operation is turned on in synchronization with a fall of an output signal of the encoder for the PC driving shaft. The actual writing position synchronized with an output signal of the synchronization detecting plate is shifted by time $t_Y - t_M$ from the original writing position to be located. Therefore, for example, a shift in color is caused by the difference $t_Y - t_M$ in time with respect to yellow and magenta images. If the writing system has e.g., 400 dpi, a maximum value of the difference $t_Y - t_M$ in time becomes one period of an output of the synchronization detecting plate. Accordingly, the shift 63.5 μm (25.4 mm/400 = 0.0635 mm) in color is caused at its maximum.

FIG. 8 is a view for explaining a driving control section in the general image forming apparatus for performing the writing operation as shown in FIGS. 7a and 7b. In this figure, reference numerals 42, 43 and 44 respectively designate a PC motor servo control board, a transfer motor servo control board and a servo control unit. The same portions as those in FIG. 2 are designated by the same reference numerals. As shown in FIG. 8, an output signal of a synchronization detecting signal 45 is used as a synchronization signal for operating a laser beam driving control plate 46. The writing operation is performed in synchronization with this output signal of the synchronization detecting plate 45 so that the writing operation is delayed as shown in FIGS. 7a and 7b.

However, in the present invention, the number of output signals of the encoder 37 for the PC drive motor is counted at the actual writing timing to determine the normal rotation start timing of the transfer drive motor 39. Accordingly, the shift in color can be reduced by one pulse of the encoder 37 for the PC drive motor as shown by the following formula when the diameter of the driving roller is set to 27 mm.

(The diameter of the driving roller)×π/20000(PLS)
=4.24(μm/PLS)        (1)

Further, in the above embodiment, each writing operation of the overlapped images is started from the same reflecting face of the polygon mirror as mentioned above. Accordingly, it is possible to form an image having no shift in color and a high quality at the overlapping and transferring times of the color images even when the position of the laser beam is changed for one rotation period of the polygon mirror by the inclination thereof, etc.

Figure 5A:
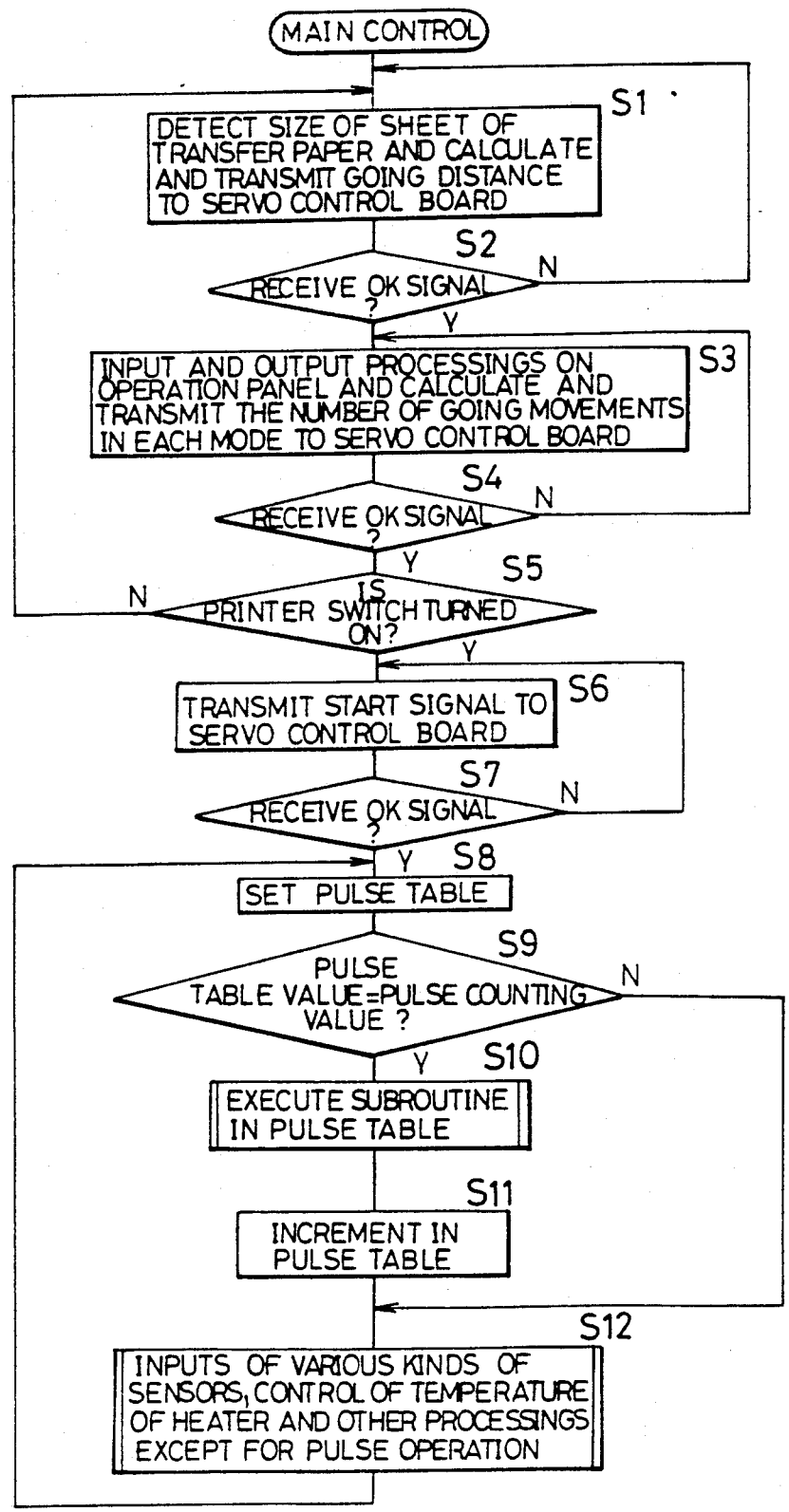
Figure 5B:
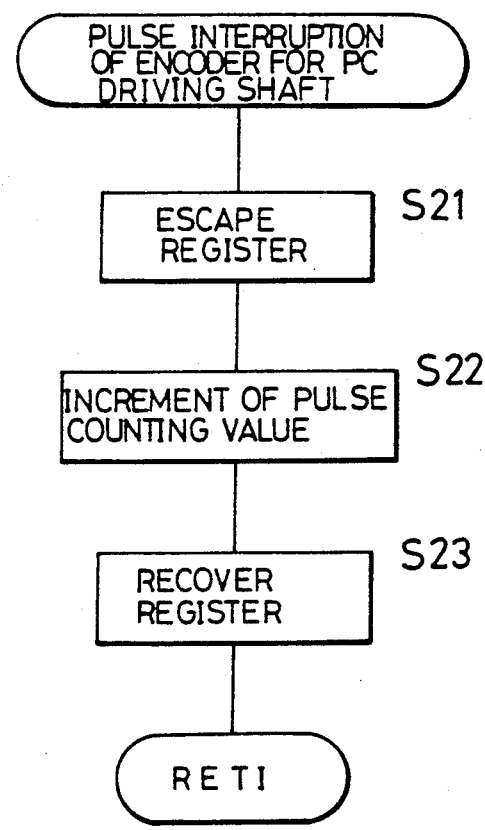
Figure 5C:
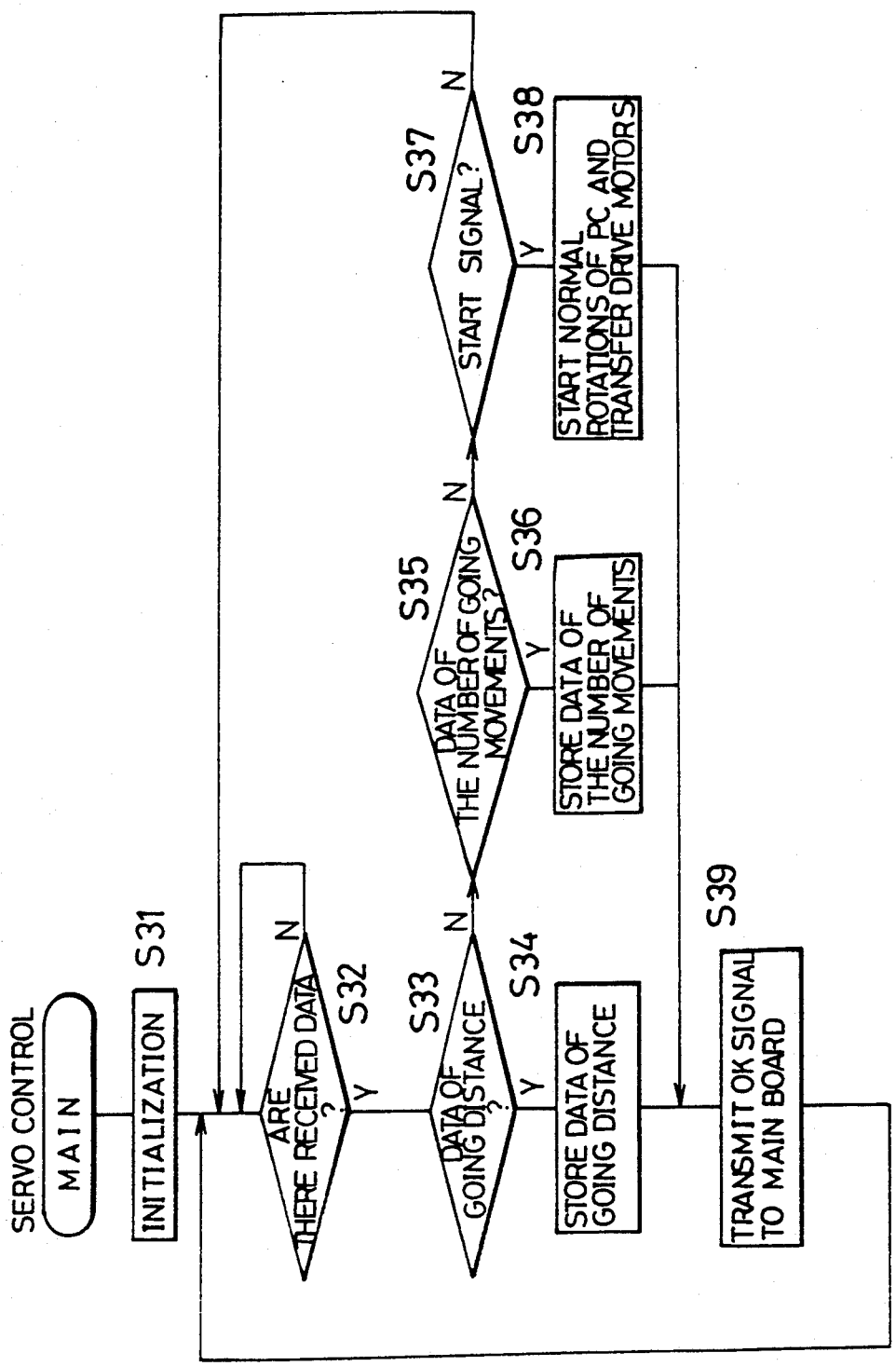
Figure 5D:
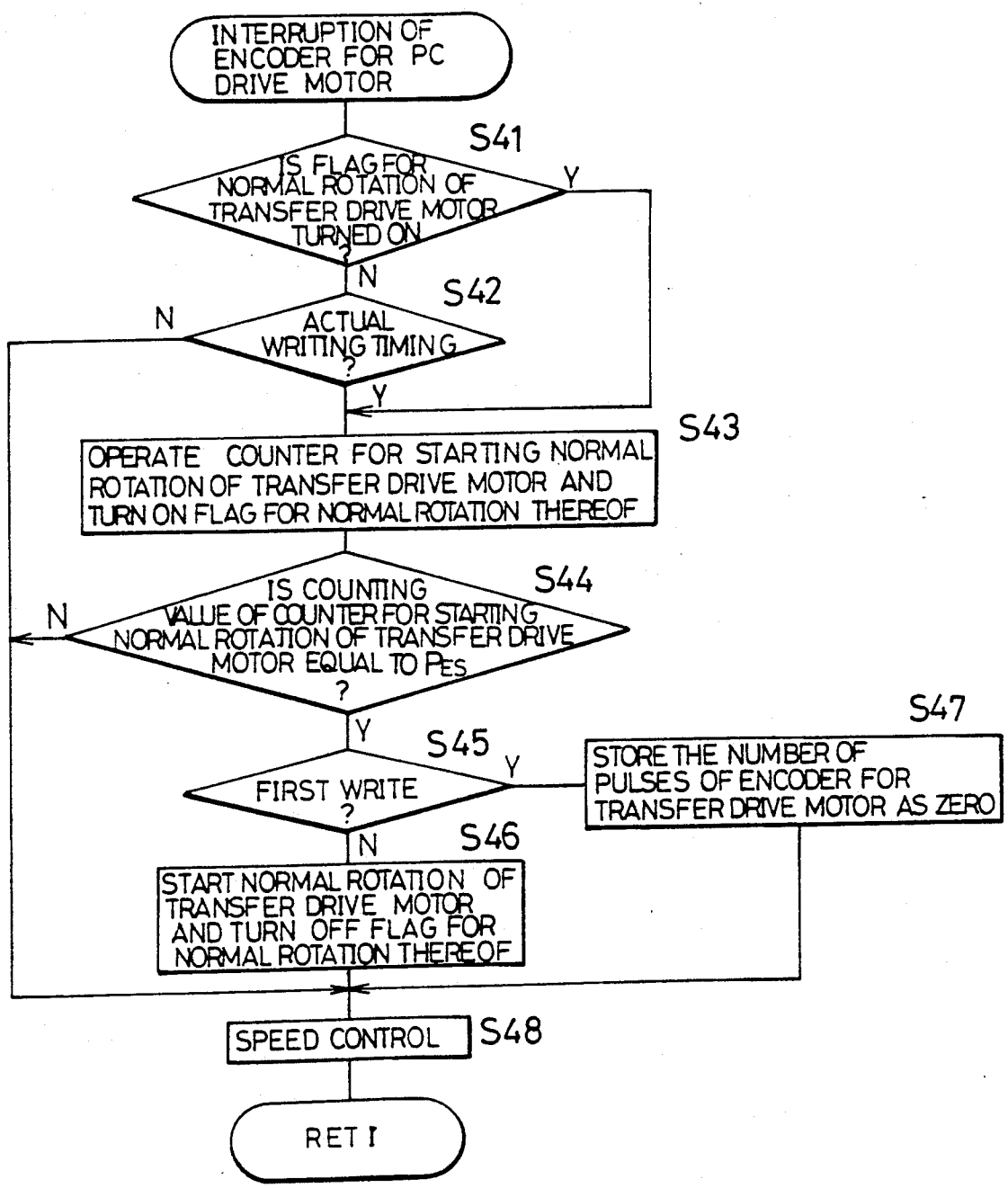
Figure 5E:
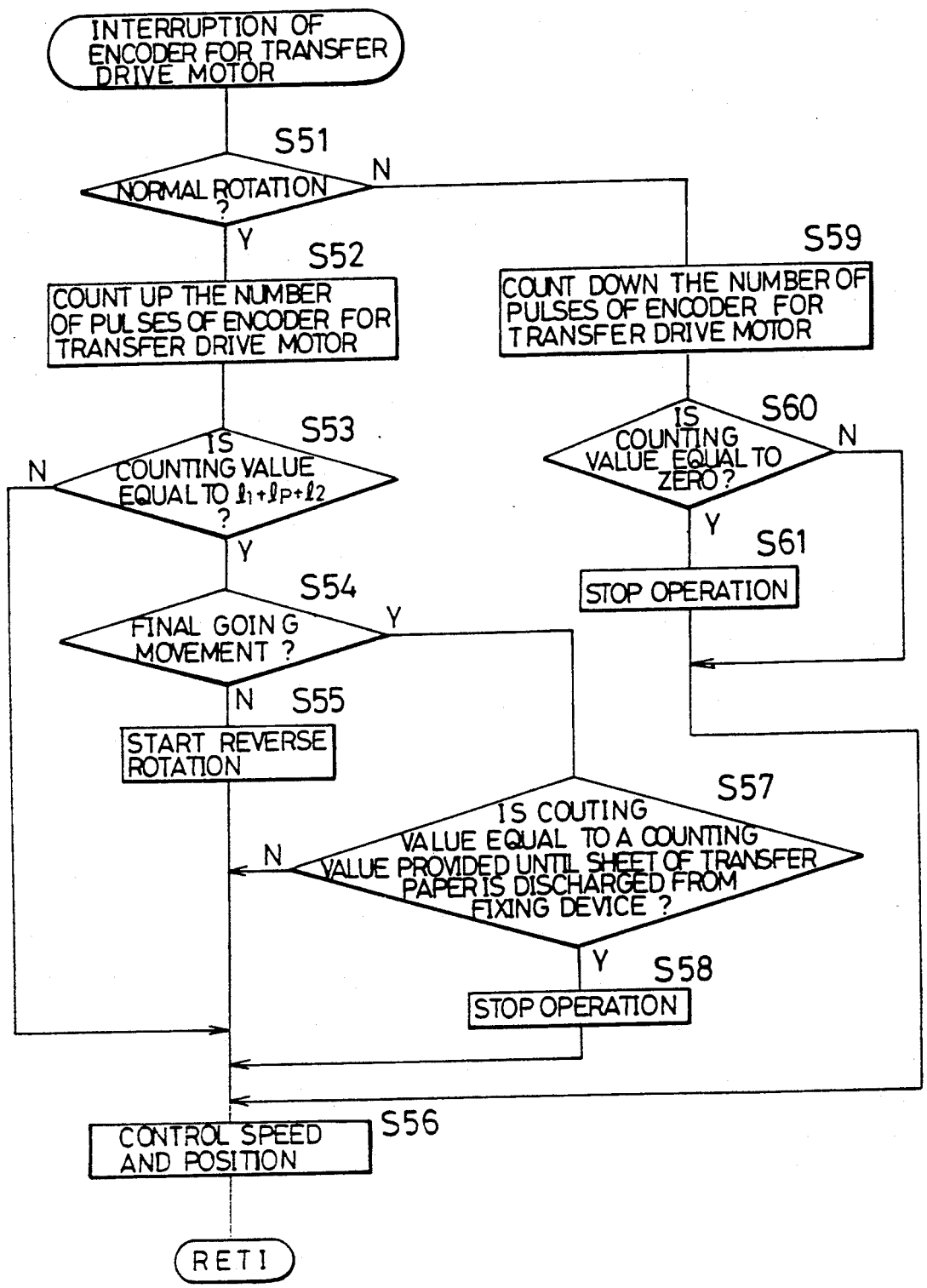

FIG. 5a is a flow chart showing the operation of the main board in the image forming apparatus in the above embodiment of the present invention. FIG. 5b is a flow chart showing a pulse interruption operation of the encoder for the PC driving shaft. FIG. 5c is a flow chart showing the operation of the servo control board. FIG. 5d is a flow chart showing an interruption operation of the encoder for the PC drive motor. FIG. 5e is a flow chart showing an interruption operation of the encoder for the transfer drive motor.

In the operation of the main board shown in FIG. 5a, the size of a sheet of transfer paper is detected in a step S1. In this step S1, a going distance of the sheet of transfer paper is further calculated and a signal indicative of this going distance is transmitted to the servo control board on the basis of the detection of the size of the sheet of transfer paper. In a step S2, it is judged whether the above OK signal is received or not.

When the OK signal is transmitted from the servo control board 47 and the judgement in the step S2 is YES, input and output processings are performed on an operation panel in a step S3. Further, the number of going movements is calculated from each processing mode and a signal indicative of the number of going movements is transmitted to the servo control board. In a step S4, it is judged whether the OK signal is received or not. When the judgment in the step S4 is YES, it proceeds to a step S5. In the step S5, it is judged whether the printer switch is turned on or not. When this judgment in the step S5 is YES, a start signal is transmitted to the servo control board in a step S6.

It is next judged in a step S7 whether the OK signal is received or not. When this judgment in this step S7 is YES, it proceeds to a step S8 in which a pulse table is set. In this pulse table, turning-on and turning-off timings of the signal waveforms shown in FIGS. 3a and 3b are set by the number of pulses.

In a step S9, it is next judged whether or not a value in the pulse table is equal to a pulse counting value. When this judgment in the step S9 is YES, a subroutine for turning on and off each of loads in the pulse table is executed in a step S10 in accordance with each pulse value. It then proceeds to a step S11 from the step S10 and an incremental operation is performed in the pulse table. Inputting operations with respect to various kinds of sensors, control with respect to temperature of a heater and other processings except for a pulse operation are performed in a step S12. When the judgment in the step S9 is NO, it directly proceeds to the step S12.

In the pulse interruption operation of the encoder for the PC driving shaft shown in FIG. 5b, a register is escaped in a step S21. In a step S22, an incremental operation is performed with respect to the counting value indicative of the number of pulses. In a step S23, the operation of the register is recovered.

In the operation of the servo control board shown in FIG. 5c, the servo control board is initialized in a step S31. In a step S32, it is judged whether or not a data signal is received from the main board. When this judgment in the step S32 is YES, it proceeds to a step S33. In the step S33, it is judged whether a data signal indicative of the going distance is received or not. When the judgment in the step S33 is YES, the data indicative of the going distance are stored to a memory in a step S34.

When the judgment in the step S33 is NO, it proceeds to a step S35. In the step S35, it is judged whether or not the above data are data indicative of the number of going movements. When the judgment in the step S35 is YES, it proceeds to a step S36 in which the data indicative of the number of going movements are stored to the memory.

When the judgment in the step S35 is NO, it proceeds to a step S37. In the step S37, it is judged whether the data signal is a start signal or not. When the judgment in the step S37 is YES, it proceeds to a step S38 in which the normal rotations of the PC drive motor 36 and the transfer drive motor 39 are started.

Thus, it proceeds to a step S39 through the steps S34, S36 and S38. In the step S39, the OK signal is transmitted to the main board.

In the flow chart showing the interruption operation of the encoder for the PC drive motor shown in FIG. 5d, it is judged in a step S41 whether a flag indicative of the normal rotation of the transfer drive motor is turned on or not. When the judgment in the step S41 is NO, it proceeds to a step S42 for judging the actual writing timing. Namely, it is judged in the step S42 whether or not there is an input from the AND circuit 49.

When the judgment in the step S42 is YES, a counter for starting the normal rotation of the transfer drive motor is counted up and the flag indicative of the normal rotation of the transfer drive motor is turned on in a step S43. Next, it is judged in a step S44 whether a counting value of the counter for starting the normal rotation of the transfer drive motor has reached the value $P_{ES}$ or not.

When the judgment in the step S44 is YES, it proceeds to a step S45 for judging a first writing operation. In the step S45, data indicative of the number of overlapped images are included in the data indicative of the number of going movements, thereby judging the first writing operation.

When the judgment in the step S45 is YES, it proceeds to a step S47 in which the number of pulses of the encoder for the transfer drive motor is stored to a memory as value zero. It then proceeds to a step S48 for controlling the rotary speed of the transfer drive motor. When the judgment in the step S45 is NO, it proceeds to a step S46 in which the normal rotation of the transfer drive motor is started and the flag indicative of the normal rotation of the transfer drive motor is turned off. It then proceeds to the step S48 for controlling the rotary speed of the transfer drive motor.

When the judgment in the step S41 is YES, it directly proceeds to the step S43. When the judgments in the steps S42 and S44 are NO, it directly proceeds to the step S48.

In the interruption operation of the encoder for the transfer drive motor shown in FIG. 5e, it is judged in a step S51 whether the transfer drive motor is rotated in the normal direction or not. When this judgment in the step S51 is YES, it proceeds to a step S52 for counting up the number of pulses of the encoder for the transfer drive motor. It then proceeds to a step S53 for judging whether or not this counting value has reached a value $l_1 + l_P + l_2$.

When the judgment in the step S53 is YES, it proceeds to a step S54 for judging a final going movement. When the judgment in the step S54 is NO, it proceeds to a step S55 for starting the reverse rotation of the transfer drive motor. It then proceeds to a step S56 for controlling the rotary speed and position of the transfer drive motor. When the judgment in the step S53 is NO, it directly proceeds to the step S56.

When the judgment in the step S54 is YES, it proceeds to a step S57 for judging whether or not the above counting value is a counting value provided until the sheet of transfer paper is discharged from the fixing device 31 shown in FIG. 1. When the judgment in the step S57 is YES, it proceeds to a step S58 for stopping the rotation of the transfer drive motor. It then proceeds to a step S56. When the judgment in the step S57 is NO, it directly proceeds to the step S56.

When the judgment in the step S51 is NO, it proceeds to a step S59 for counting down the number of pulses of the encoder for the transfer drive motor. It then proceeds to a step S60 for judging whether the counting value is zero or not. When the judgment in the step S60 is YES, it proceeds to a step S61 for stopping the rotation of the transfer drive motor. It then proceeds to the step S56. In contrast to this, when the judgment in the step S60 is NO, it directly proceeds to the step S56.

As mentioned above, in accordance with this embodiment, the writing operation of overlapped images is started from the same reflecting face of the polygon mirror. Accordingly, it is possible to prevent the shift in color caused by the inclination of a polygon mirror face without any special precise processing therefor and any high-class correction optical system.

Further, in this embodiment, the transfer means is operated and alignment of the overlapped images is controlled by using a position as a reference in which a front end of an image written to the photosensitive body in synchronization with the output signal of the synchronization detecting plate 45 is moved by a predetermined distance. Accordingly, it is possible to prevent the quality of an image from being reduced by the shift in color.

Further, no shift in color is caused even when the moving speed of the photosensitive body belt 1 is changed since the transfer control with respect to the overlapped images is performed in a position in which the photosensitive body belt is moved by a predetermined distance from the writing timing.

Further, a command control line between the servo control board and the main board 41 for performing the sequential operation is composed of only a serial communication line and one line synchronization detecting output line. Therefore, the number of input and output interfaces for response at a high speed between both the boards is reduced so that the load of a central processing unit for each control is reduced and reliability is improved.

As mentioned above, in accordance with the present invention, it is possible to prevent the shift in color caused by the inclination of a polygon mirror face without any precise processing therefor and any high-class correction optical system.

Further, in addition to the above effects, it is also possible to completely prevent the shift in color caused by eccentricity of a driving roller for the photosensitive body.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:
   means for performing a scanning operation using a laser beam by a polygon mirror at a predetermined timing;
   writing means for sequentially forming a plurality of images by repeatedly performing an optical writing operation a plurality of times on a photosensitive body;
   transfer means for sequentially overlapping and transferring said plurality of images onto a transferred member; and
   means for starting the optical writing operation each time by said writing means from the same polygon mirror face.

2. An image forming apparatus as claimed in claim 1, wherein the photosensitive body comprises a photosensitive body belt and the optical writing operation is started from the same polygon mirror face approximately every integral multiple of one rotation of a driving roller for the photosensitive body.

3. An image forming apparatus as claimed in claim 2, wherein the same polygon mirror face is located in the vicinity of the driving roller for the photosensitive body.

4. An image forming apparatus as claimed in claim 1, wherein the transfer means is operated and alignment of the overlapped images is controlled by using a position as a reference in which a front end of an image written to the photosensitive body is moved by a predetermined distance.

5. An image forming apparatus as claimed in claim 1, wherein transfer control with respect to the overlapped images is performed in a position in which the photosensitive body is moved by a predetermined distance from a writing timing.

6. An image forming apparatus as claimed in claim 1, wherein the transferred member is constructed by a sheet of transfer paper.

* * * * *

UNITED STATES PATENT AND TRADEMARK OFFICE
CERTIFICATE OF CORRECTION

PATENT NO. : 5,083,141
DATED : January 21, 1992
INVENTOR(S) : Kazushige Taguchi et al.

It is certified that error appears in the above-identified patent and that said Letters Patent is hereby corrected as shown below:

ON THE TITLE PAGE

Item [75], inventors residence "Warabe" should be --Warabi--.

Item [30], Foreign Application Priority data, 2nd and 3rd line should read

--Nov. 21, 1989 [JP]  Japan...............1-300741

Mar. 5, 1990  [JP]  Japan...............2-51886--.

Signed and Sealed this

Eighth Day of June, 1993

Attest:

MICHAEL K. KIRK

Attesting Officer

Acting Commissioner of Patents and Trademarks